(12) United States Patent
Sheldon et al.

(10) Patent No.: US 6,777,049 B2
(45) Date of Patent: Aug. 17, 2004

(54) STRUCTURAL FOAM

(75) Inventors: Simon Sheldon, Grantham Lincs (GB); Eric Le Gall, Strasbourg (FR); Jean Philippe Bourdin, Obernai (FR); Serge Bieber, Haegen (FR)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/008,505

(22) Filed: Nov. 8, 2001

(65) Prior Publication Data

US 2002/0160130 A1 Oct. 31, 2002

(30) Foreign Application Priority Data

Mar. 20, 2001 (GB) .............................................. 0106911

(51) Int. Cl.$^7$ .......................... B29D 22/00; B29D 23/00; B32B 1/08
(52) U.S. Cl. ........................ 428/35.8; 428/71; 428/120; 428/122; 428/137; 428/36.5; 428/35.8; 52/793.1; 293/109; 293/132; 296/188; 296/205
(58) Field of Search ........................... 428/122, 71, 119, 428/120, 137, 36.5, 35.7, 35.8; 52/793.1; 293/109, 120, 136, 132; 296/188, 205

(56) References Cited

U.S. PATENT DOCUMENTS

| 4,083,384 A | 4/1978 | Horne et al. |
|---|---|---|
| 4,463,870 A | 8/1984 | Coburn, Jr. et al. |
| 4,610,836 A | 9/1986 | Wycech |
| 4,695,343 A | 9/1987 | Wycech |
| 4,732,806 A | 3/1988 | Wycech |
| 4,751,249 A * | 6/1988 | Wycech ........................ 521/54 |
| 4,769,391 A | 9/1988 | Wycech |
| 4,813,690 A | 3/1989 | Coburn, Jr. |
| 4,822,011 A | 4/1989 | Goldbach et al. |
| 4,836,516 A | 6/1989 | Wycech |
| 4,853,270 A | 8/1989 | Wycech |
| 4,861,097 A | 8/1989 | Wycech |
| 4,867,271 A | 9/1989 | Tschudin-Mahrer |
| 4,901,500 A | 2/1990 | Wycech |
| 4,908,930 A | 3/1990 | Wycech |

(List continued on next page.)

FOREIGN PATENT DOCUMENTS

| DE | 19812288 C1 | 5/1999 |
|---|---|---|
| DE | 19856255 C1 | 1/2000 |
| DE | 19858903 A1 | 6/2000 |
| EP | 0 383 498 A2 | 8/1990 |
| EP | 0611778 A3 | 8/1994 |
| EP | 0891918 A1 | 1/1999 |
| EP | 0893331 A1 | 1/1999 |
| EP | 0893332 A1 | 1/1999 |
| EP | 1 122 152 A2 | 8/2001 |
| EP | 1 122 156 A2 | 8/2001 |

(List continued on next page.)

OTHER PUBLICATIONS

Search Report dated Aug. 23, 2002.
Written Opinion dated Mar. 28, 2003.
Copending application Ser. No. 09/459,756 filed Dec. 10, 1999.

(List continued on next page.)

*Primary Examiner*—Harold Pyon
*Assistant Examiner*—Michael C. Miggins
(74) *Attorney, Agent, or Firm*—Dobrusin & Thennisch PC

(57) ABSTRACT

A structural reinforcement for a hollow member comprising a rigid reinforcing member having a shape that substantially conforms to the cross section of the section of the hollow member to be reinforced with an expandable adhesive material over at least a portion of the surface of the rigid reinforcing member sufficient to bond the reinforcing member to at least two nonparallel internal surfaces of the structure.

36 Claims, 4 Drawing Sheets

U.S. PATENT DOCUMENTS

| | | |
|---|---|---|
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,194,199 A | 3/1993 | Thum |
| 5,266,133 A | 11/1993 | Hanley et al. |
| 5,288,538 A | 2/1994 | Spears |
| 5,358,397 A | 10/1994 | Ligon et al. |
| 5,373,027 A | 12/1994 | Hanley et al. |
| 5,506,025 A | 4/1996 | Otto et al. |
| 5,575,526 A | 11/1996 | Wycech |
| 5,660,116 A | 8/1997 | Dannawi et al. |
| 5,755,486 A | 5/1998 | Wycech |
| 5,819,408 A | 10/1998 | Catlin |
| 5,884,960 A | 3/1999 | Wycech |
| 5,888,600 A | 3/1999 | Wycech |
| 5,894,071 A | 4/1999 | Merz et al. |
| 5,941,597 A | 8/1999 | Horiuchi et al. |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,059,342 A | 5/2000 | Karwai et al. |
| 6,068,424 A | 5/2000 | Wycech |
| 6,079,180 A | 6/2000 | Wycech |
| 6,092,864 A | 7/2000 | Wycech et al. |
| 6,096,403 A | 8/2000 | Wycech |
| 6,099,948 A | 8/2000 | Paver, Jr. |
| 6,103,341 A | 8/2000 | Barz et al. |
| 6,103,784 A | 8/2000 | Hilborn et al. |
| 6,131,897 A | 10/2000 | Barz et al. |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 * | 3/2001 | Hopton et al. ............... 296/187 |
| 6,232,433 B1 | 5/2001 | Narayan |
| 6,233,826 B1 * | 5/2001 | Wycech ..................... 29/897.1 |
| 6,237,304 B1 | 5/2001 | Wycech |
| 6,247,287 B1 | 6/2001 | Takabatake |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |
| 6,305,136 B1 * | 10/2001 | Hopton et al. ............. 52/309.7 |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 * | 12/2001 | Wycech ....................... 403/171 |
| 6,341,467 B1 | 1/2002 | Wycech |
| 6,348,513 B1 | 2/2002 | Hilborn et al. |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| 6,378,933 B1 | 4/2002 | Schoen et al. |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,455,146 B1 | 9/2002 | Fitzgerald |
| 6,467,834 B1 | 10/2002 | Barz et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,519,854 B2 | 2/2003 | Blank |
| 6,523,857 B1 | 2/2003 | Hopton et al. |
| 6,546,693 B2 | 4/2003 | Wycech |
| 2001/0020794 A1 | 9/2001 | Ishikawa |
| 2001/0042353 A1 | 11/2001 | Honda et al. |
| 2002/0033617 A1 | 3/2002 | Blank |
| 2002/0033618 A1 | 3/2002 | Kwon |
| 2002/0053179 A1 | 5/2002 | Wycech |
| 2002/0054988 A1 | 5/2002 | Wycech |
| 2002/0074827 A1 | 6/2002 | Fitzgerald et al. |
| 2003/0057737 A1 | 3/2003 | Bock et al. |
| 2003/0069335 A1 | 4/2003 | Czaplicki et al. |

FOREIGN PATENT DOCUMENTS

| | | |
|---|---|---|
| EP | 0893332 B1 | 3/2002 |
| FR | 2 749 263 | 12/1997 |
| GB | 2 375 328 A | 11/2002 |
| JP | 58-87668 | 6/1983 |
| JP | 7-117728 | 5/1995 |
| JP | 7-31569 | 6/1995 |
| JP | 10-053156 | 2/1998 |
| JP | 02001191949 A | 7/2001 |
| JP | 2002331960 | 11/2002 |
| WO | WO89/06595 | 7/1989 |
| WO | WO95/32110 | 11/1995 |
| WO | WO97/02967 | 1/1997 |
| WO | WO97/43501 | 11/1997 |
| WO | 98/21060 | 5/1998 |
| WO | WO98/36944 | 8/1998 |
| WO | WO98/50221 | 11/1998 |
| WO | WO99/08854 | 2/1999 |
| WO | WO99/28575 | 6/1999 |
| WO | WO99/48746 | 9/1999 |
| WO | WO99/50057 | 10/1999 |
| WO | 99/61289 | 12/1999 |
| WO | WO00/03894 | 1/2000 |
| WO | WO00/12571 | 3/2000 |
| WO | WO00/12595 | 3/2000 |
| WO | WO00/13876 | 3/2000 |
| WO | WO00/13958 | 3/2000 |
| WO | WO00/20483 | 4/2000 |
| WO | WO00/27920 | 5/2000 |
| WO | WO00/37302 | 6/2000 |
| WO | WO00/37554 | 6/2000 |
| WO | WO00/39232 | 7/2000 |
| WO | WO00/40629 | 7/2000 |
| WO | WO00/40815 | 7/2000 |
| WO | WO00/43254 | 7/2000 |
| WO | WO00/52086 | 9/2000 |
| WO | WO00/55444 | 9/2000 |
| WO | WO00/46461 | 8/2001 |
| WO | WO01/54936 | 8/2001 |
| WO | WO01/56845 | 8/2001 |
| WO | WO 01/68394 A2 | 9/2001 |
| WO | WO01/71225 | 9/2001 |
| WO | WO01/83206 | 11/2001 |
| WO | WO 01/88033 A1 | 11/2001 |

OTHER PUBLICATIONS

Copending application Ser. No. 09/502,686 filed Feb. 11, 2000.
Copending application Ser. No. 09/524,961 filed Mar. 14, 2000.
Copending application Ser. No. 09/631,211 filed Aug. 3, 2000.
Copending application Ser. No. 09/858,939 filed May 16, 2001.
Copending application Ser. No. 09/655,965 filed Sep. 6, 2000.
Copending application Ser. No. 09/676,335 filed Sep. 29, 2000.
Copending application Ser. No. 09/676,725 filed Sep. 29, 2000.
Copending application Ser. No. 09/859,126 filed May 16, 2001.
Copending application Ser. No. 10/163,894 filed Jun. 4, 2002.
Copending application Ser. No. 09/906,289 filed Jul. 16, 2001.
Copending application Ser. No. 09/939,152 filed Aug. 24, 2001.
Copending application Ser. No. 60/317,009 filed Sep. 4, 2001.
Copending application Ser. No. 60/318,183 filed Sep. 7, 2001.
Copending application Ser. No. 09/974,017 filed Oct. 10, 2001.
Copending application Ser. No. 60/324,497 filed Sep. 24, 2001.
Copending application Ser. No. 09/982,681 filed Oct. 18, 2001.
Copending application Ser. No. 10/008,194 filed Nov. 8, 2001, which claims priority from European application No. 0111151.7 filed May 8, 2001.
Copending Application Ser. No. 10/233,919 filed Sep. 3, 2002.
Search Report dated Jun. 15, 2001.

* cited by examiner

STRUCTURAL FOAM

FIELD OF THE INVENTION

The present invention relates to reinforcing materials and in particular to reinforcing materials that can be provided in hollow cross-sectional members particularly to provide reinforcement to improve the structural integrity of articles.

BACKGROUND OF THE INVENTION

The trends in motor vehicle design are towards lighter vehicles to improve fuel consumption. At the same time, auto manufacturers continue to demand more rigorous structural performance standards. The use of lighter materials such as aluminum to produce the hollow cross-sectional members that are used as vehicle sub frames has lead to the desire for additional reinforcement. There is a need for reinforcement in various locations in the vehicle structure including the sub frame and upper structure and the form of reinforcement required can vary from one location in the vehicle to another and from vehicle to vehicle. The present invention therefore improves the strength of vehicles structures made from existing materials and enables vehicle structures based on lighter materials to satisfy safety requirements they are otherwise unable to satisfy.

The electrocoat process used in vehicle manufacture is a process in which the vehicle structure is passed through a bath of anticorrosion fluid and the vehicle is used as an electrode whereby an anticorrosion coating is deposited from the fluid onto the vehicle structure by electrolysis. The invention further provides a system whereby reinforcement can be provided whilst ensuring effective provision of an anti-corrosion coating on the inner surface of the hollow cross-sectional member by the electrocoat process.

There are four main types of applications where structural reinforcement is desired in vehicles. In one, control over vehicle body deformation is attractive for assisting in accident management. In another, it is desirable for increased energy absorption to enhance performance after yield of a structure. The reduction of flexing or body movement in the vehicle structure particular to improve durability and reduce stress effects and point mobility issues requiring the reduction of resonance by the provision of stiffening. The need for reinforcement is present irrespective of the materials that are used to produce the vehicle structure and the need varies from material to material according to the nature of the reinforcement that is being provided. The reinforcing parts can also reduce the noise created by the motion of a vehicle by having a sound deadening effect as a result of blocking air paths in cavities.

It is known to provide longitudinal reinforcing structures within the hollow cross sections of vehicles. For example, PCT Publication WO97/43501 provides a beam, which can be mounted within the cross section to provide reinforcement along one axis in a hollow structure. The beam is provided with an expandable adhesive on two surfaces, which can be foamed upon heating to bond the beam to two opposed walls of the cross section. This technique is not suitable for use in an electrocoat process commonly encountered in automotive applications. Furthermore, the beam will only provide significant reinforcement along the axis of the beam. In WO97/43501 the beam with foamable material on opposed surfaces is placed in the cavity and subsequently foamed under the action of heat. This will result in uneven foaming and to non-uniform foam structures since on the underside the foam must raise the weight of the beam whereas expansion on the topside is free.

It is also known to provide foamable plastic mouldings within the hollow cross sections which can be foamed upon application of heat, such as is provided by the baking step in the electrocoat process, to provide a foamed baffle that fills the cross-section to provide sound adsorption. Such systems are described in European patent applications 0383498 and 0611778. The foam baffle provides sound deadening and vibration resistance. In these systems the entire insert is foamable and it is proposed that the foamable material be chosen so that it will foam during the baking process, which follows the electrocoat process typically used in vehicle manufacture to provide resistance to metal corrosion. The materials of these patents are not however reinforcing materials but are used to provide acoustic baffles and seals.

In the electrocoat process a vehicle structure is immersed in a bath of coating fluid from which an anticorrosion coating is deposited on the metal by electrolysis. The vehicle metal structure is subsequently heated to bake the coating on the metal. The electrocoat process is typically applied to complete vehicle structures in which hollow sections have been capped. Accordingly reinforcing structures are preferably provided within hollow sections prior to the electrocoat. It is therefore important that the reinforcing structure have minimal impact on the operation and efficiency of the electrocoat process.

Where reinforcing materials have been provided they have either been stuck to the metal structure prior to subjecting the vehicle structure to the electrocoat process or have been provided after the electrocoat process. The former technique has the problem that it is not possible to perform the electrocoat over the entire surface, which can lead to local areas of corrosion. The latter technique is cumbersome and requires the provision of fastening means after electrocoating, which can damage the electrocoat and again lead to local areas of corrosion.

There is therefore a need to provide structural reinforcement for the hollow cross-sections of vehicles, which is easily supplied, works well within the bounds of the electrocoat process and provides effective reinforcement to the vehicle both during operation and as crash protection.

The present invention therefore provides a structural reinforcement for a hollow member comprising a rigid reinforcing member having a shape that substantially conforms to the cross section of the section of the hollow member to be reinforced with an expandable adhesive material over at least a portion of the surface of said rigid reinforcing member sufficient to bond the reinforcing member to at least two non parallel internal surfaces of the structure.

In one aspect of the invention, the dimensions of the rigid reinforcing member and the thickness and nature of the expandable material are important to the achievement of the desired structural reinforcement. The exterior shape of the reinforcing member should conform substantially to the cross section of the section of the structure it is designed to reinforce. The shape may vary along the length of the reinforcing member as the dimensions of the cross section of the structure change. The size of the reinforcing member including the expandable adhesive material should be such that there is a small clearance between the extremity of the reinforcing member and the interior walls of the structure it is to be reinforced (e.g., the frame of the vehicle) to allow for passage of the electrocoat fluid. Preferably, the reinforcing member has a cellular, honeycomb or ribbed internal structure to provide reinforcement along several different axes.

In a preferred embodiment the structural reinforcing member is provided with small lugs, which enable it to stand away from the interior walls of the sections of the structure to be reinforced. In this way fastening devices are not required and the area of contact between the structural reinforcing member and the interior walls of the structure is minimized. In a preferred embodiment, the clearance between the extremity of the reinforcing member and the interior walls of the structure (e.g., frame of the vehicle) must be wide enough to enable the liquid used in any coating (such as the electrocoat bath) to flow between the reinforcing member and the interior walls of the sections of the structure in sufficient quantity to enable an effective coating (e.g., anti-corrosion coating) to be deposited. On the other hand, the clearance must not be too wide since this can result in a lack of rigidity in the structure when the expandable adhesive is foamed to fill the clearance and bond the structural reinforcing member to the interior walls of the structure. Preferably, the clearance is no more than 1 centimeter and is more preferably 3 to 10 millimeters. The clearance around the whole structure enables a more uniform foam structure to be obtained.

The rigid reinforcing member may be made from any suitable material, for example it may be made of metal or plastic and the material will be chosen according to the preferred fabrication method. This in turn is driven by economics and the complexity of the cross section to be reinforced. Reinforcing members for simple cross sections may be prepared by extrusion whilst injection moulding may be required for more complex structures. Metal members may be produced by stamping and/or forming. Where extrusion is used the members may be of metal or thermoplastics; where injection moulding is used thermoplastics are preferred. Polyamides, particularly glass filled polyamides are suitable materials due to their high strength to weight ratio. Alternatively injection moulding or die casting of metal alloys (either densified or foamed) may be employed. It is preferred that the moulding is provided with means enabling fluid drainage. For example, holes may be provided in the moulding to allow the drainage of water, which may condense in the structure over time.

The preferred shape and structure of the reinforcing member will depend upon where it is to be located in the structure and the function it is to perform. For example, if it is to be located in the front longitudinal section of a vehicle it will be designed for crash or impact resistance. On the other hand, it may be designed to reduce point mobility such as for example at the base of side and rear pillars. This is particularly important with high-sided vehicles where the reinforcement potentially can help reduce or prevent vehicle sway thus reducing metal fatigue. Other applications include the resistance of deformation of the rear longitudinal section, in particular to help prevent upward deformation from certain rear impacts. Other parts of the vehicle which may be reinforced by the techniques of the present invention include roof structures, pillars, frame cross members and window frames particularly rear window frames.

The expandable adhesive material serves two main functions, it will expand to fill the space between the reinforcing member and the interior of the structure to be reinforced and it will also bond to the interior wall of the structure. Accordingly, expandable adhesive material means that the material can be activated to both expand (typically foam) and to act as an adhesive. Activation therefore enables the expandable material to expand and fill a gap between the reinforcing member and a hollow structure it is designed to reinforce and to bond to the internal surface of the hollow structure. Accordingly the expandable adhesive must expand at the desired temperature and be sufficiently adhesive to firmly bond the reinforcing member inside the vehicle structure. Once foamed it should be sufficiently strong that it does not materially detract from the overall reinforcing effect provided.

Whilst it is not essential it is preferred that prior to activation, the expandable adhesive material is dry and not tacky to the touch. It is preferred that the expandable material is not tacky to the touch since this facilitates shipping and handling and prevents contamination. Examples of preferred foamable materials include foamable epoxy-base resins and examples of such materials are the products L5206, L5207, L5208 and L5209, which are commercially available from L & L Products of Romeo, Mich. USA, and the Betacore Products BC 5204, 5206, 5205 and 5208 available from Core Products, Strasbourg, France. The product should be chosen according to the rate of expansion and foam densities required. It is further preferred that it expand at the temperatures experienced in the electrocoat baking oven, typically 130° C.–150° C.

The expandable adhesive material should be applied to at least a portion of the surface of the rigid reinforcing member that will be adjacent to an interior surface of the section of the structure that is to be reinforced. It is preferred that the foamable material be applied over at least part of all the surfaces of the reinforcing member that are adjacent to the interior surface of the section. This will depend upon the shape of the section to be reinforced but it should be present so that it provides adhesion to two non-parallel surfaces to give rigidity in at least two dimensions. It is preferred that the foamable material be applied over at least part of each of the top and bottom and the sides of the reinforcing member. In this way when the material is foamed it can expand to fill the gap around the entire surface of the reinforcing member that is adjacent to the interior walls. The expandable material may be applied to the rigid reinforcing member by bonding a strip of the material to the member, by extrusion coating or by injection moulding. Where the reinforcing member is made by injection moulding the expandable material may be applied by over-moulding or two shot injection moulding. The material should however be applied under conditions such that no foaming takes place.

It is preferred that the reinforcing member coated with the expandable material is located within the hollow member that it is designed to reinforce in a manner that provides a clearance between the external surface of the coated member and the internal surface of the hollow member. This allows for the passage of coating fluid between the member and the internal surface and also enables a uniform expansion of the foam around the member to provide more uniform reinforcement. Accordingly in a preferred process for providing reinforcement within hollow structures such as a vehicle frame, moulded reinforcing members with the layer of foamable adhesive thereon are installed during assembly of the vehicle frame. Locating lugs are preferably moulded into the reinforcing member or the expandable material so that the reinforcing member sits within the vehicle structure leaving a space between the member and the interior walls of the cavity to be reinforced, in this way there is no need for fastening or bonding means to attach the member to the interior walls. The assembled structure is then subjected to the electrocoat process in which it is passed through a bath of coating material and a corrosion resistant coating is deposited onto the structure by electrolysis. The vehicle structure is then dried in an oven to provide the final coating and the expandable adhesive is preferably chosen so that it is activated by the drying conditions used in the oven employed to bake the coating on the electrocoat process. In this way the expandable material will expand under the drying conditions to provide a foam that fills the space between the member and the interior walls and will produce a strong bond between the reinforcing member and the interior wall. Typically the coated structure is dried at around 165° C. for about 20 minutes and accordingly the adhesive should expand under these conditions. The industry is however looking to use lower drying temperatures and shorter drying times and this may influence the choice of expandable adhesive materials.

If other components for example bolts are to pass through the reinforcing members during subsequent assembly care must be taken to ensure that holes formed in the reinforcing member for the passage of the bolts are not blocked by the foam as it expands.

The techniques of the present invention may be used for the reinforcement of any construction that is based on a hollow frame structure. Thus, the present invention is not limited to automotive vehicle applications. The structural reinforcement may be employed for reinforcing any of a variety of different structures in which a cavity or wall is available against which the expandable adhesive material may contact and bond. Examples of such applications include reinforcements for household appliances, furniture, storage containers, luggage, seating, building materials or other architectural structures, aerospace structures, marine structures, railway structures, or the like. The techniques are particularly useful in the current trend towards using lighter and sometimes weaker materials in the production of automobile sub frames where there is a greater need for reinforcement to compensate for the reduction in strength of the basic material and yet satisfy the safety requirements. This is particularly the case with the use of aluminum for the production of automotive vehicles.

BRIEF DESCRIPTION OF DRAWINGS

The present invention is illustrated by reference to the accompanying drawings in which.

DETAILED DESCRIPTION OF PREFERRED EMBODIMENT

Figure 1:
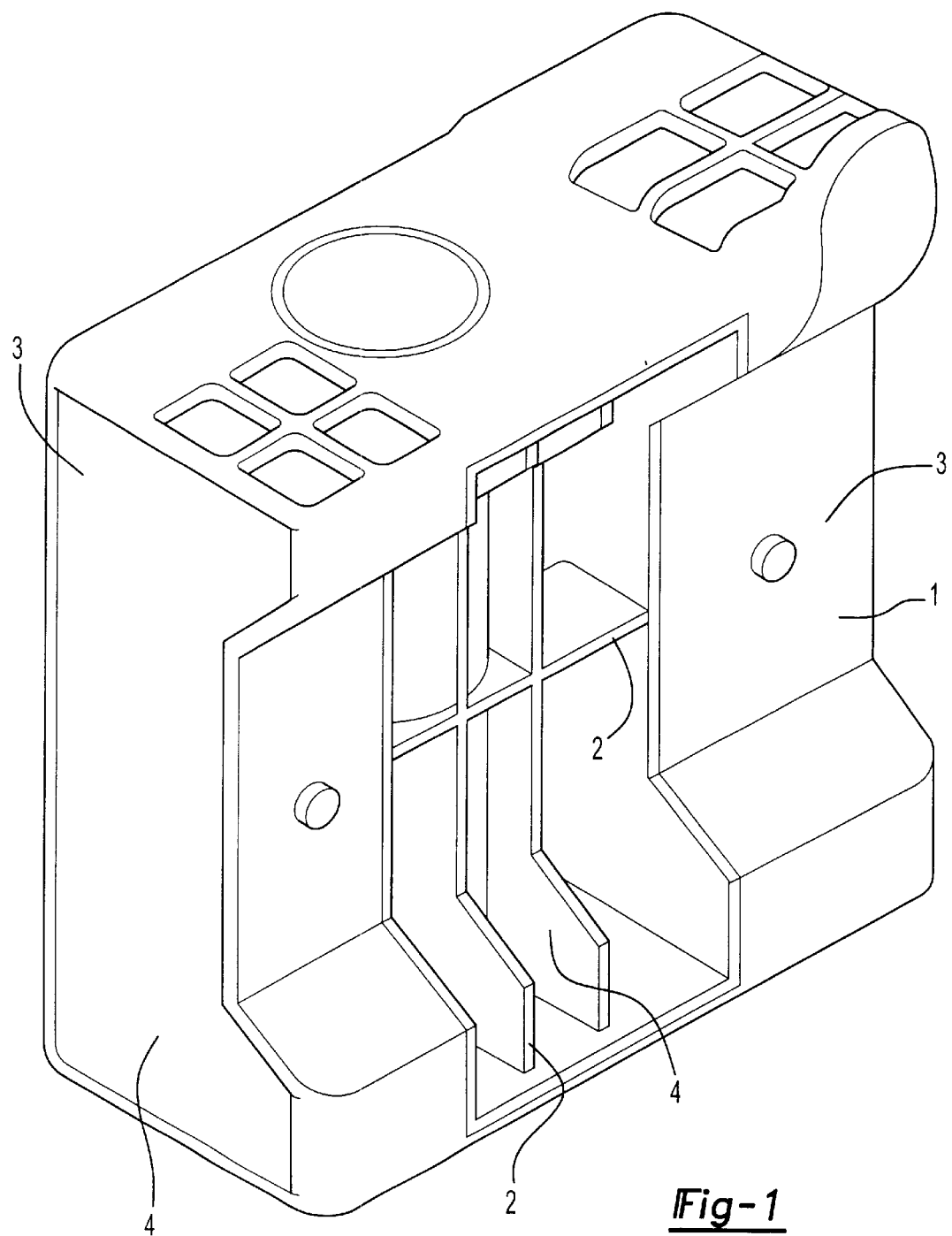
FIG. 1 illustrates a plan view of a first preferred embodiment of a moulding according to the present invention that is designed to limit point mobility.

The present invention is illustrated by reference to the accompanying drawings in which FIG. 1 shows a moulding according to the present invention.

Figure 2:
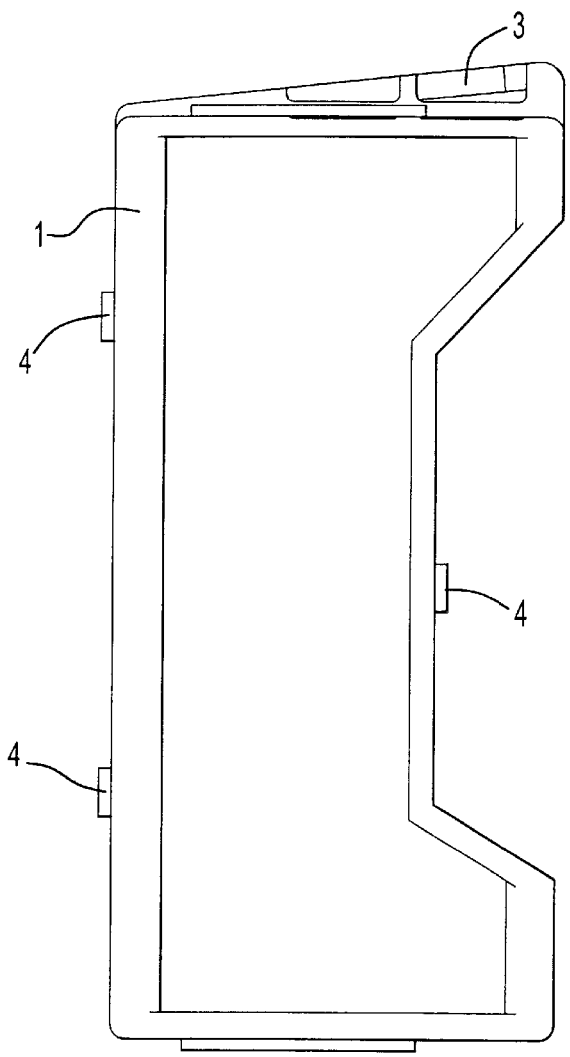
FIG. 2 illustrates a side view of the moulding in FIG. 1.
Figure 3:
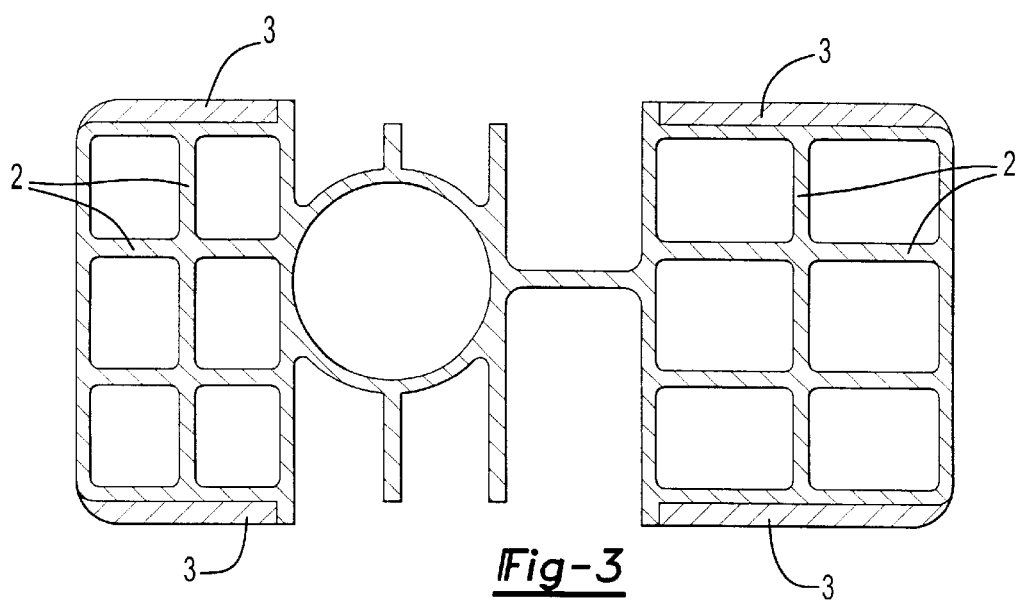
FIG. 3 illustrates a cross-section of the moulding in FIG. 1 showing the interior cellular structure of the moulding of the present invention.

FIG. 1 is of a moulding designed to limit point mobility and prevent what is known as lozenging. The moulding consists of a reinforcing member 1 moulded to conform to the cross section of the front longitudinal section of a vehicle. The reinforcing member consists of a frame with transverse and longitudinal ribs 2 to provide compression strength and torsional resistance. The moulding has been over moulded at the two ends with layers of an expandable adhesive 3. FIG. 2 is an end elevation of the moulding showing the lugs 4 which will locate the moulding within the vehicle cross section. FIG. 3 is a cross section of the moulding shown in FIG. 1 illustrating the cellular structure.

Figures 4, 5:
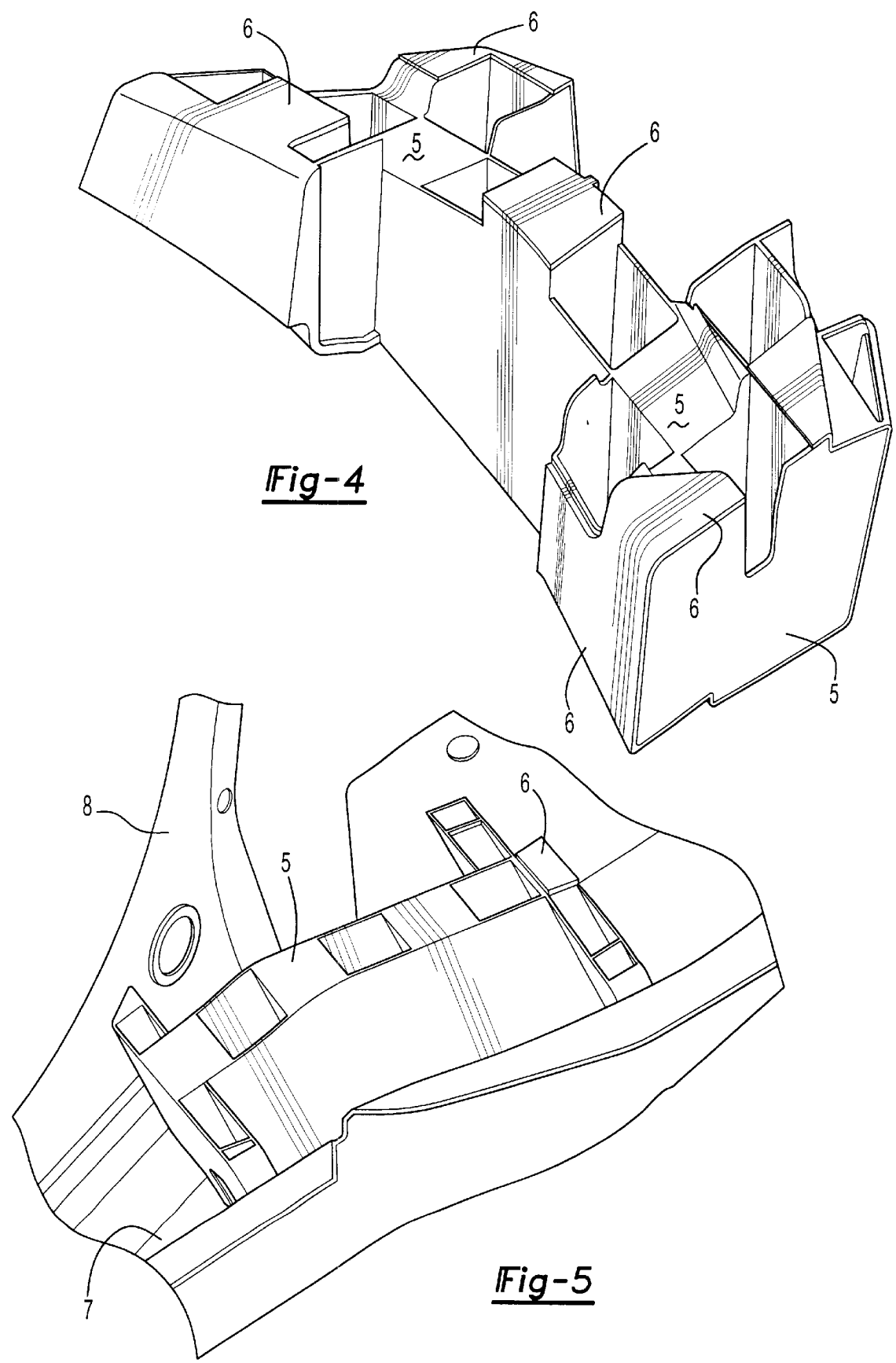
FIG. 4 illustrates a plan view of a second preferred embodiment of the moulding of the present invention that is suitable for resisting deformation.
FIG. 5 illustrates the moulding of FIG. 4 in position on the floor of a vehicle.

FIG. 4 shows an alternate form of moulding which is suitable for resisting deformation particularly in the rear longitudinal section of a vehicle. This moulding is especially useful in the preventing the floor bending upwards upon a rear impact.

The moulding shown in FIG. 4 is a polyamide moulding 5, which is over-moulded in those areas, which are to be in proximity to the internal surface of the vehicle frame with a foamable structural foam material 6.

Figure 6:
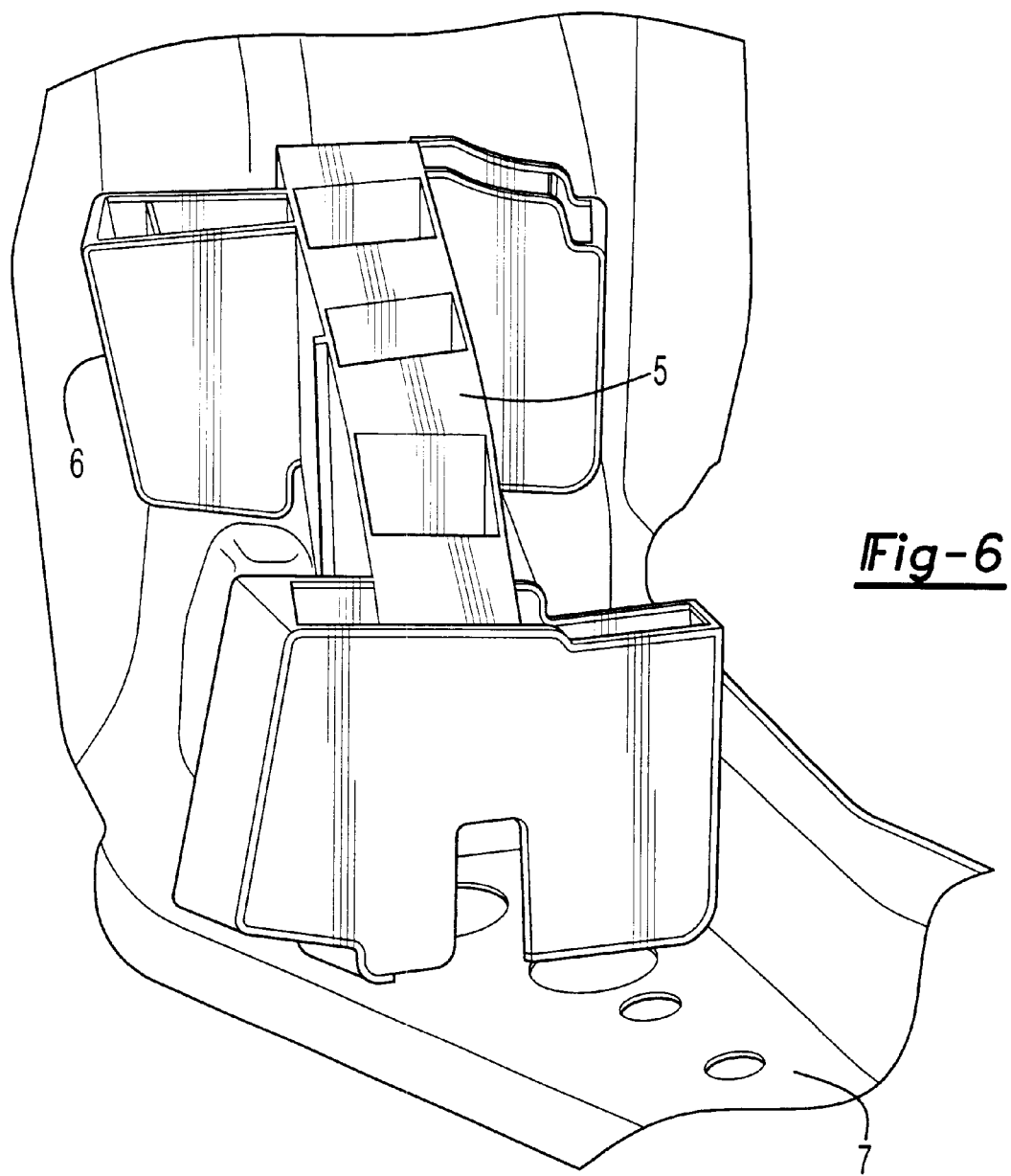
FIG. 6 illustrates an expanded view of the moulding in FIGS. 4 and 5.

The moulding is designed to provide reinforcement at the position where the rear door pillar of the vehicle joins the vehicle floor frame. FIG. 5 shows the piece in position on the floor section 7 at the base of the rear door pillar 8 and FIG. 6 is an expanded view of the moulding lying in position on the floor section 7.

When the vehicle assembly is completed it can be passed through the electrocoat process and when it is heated to bake the electrocoat coating the foamable structural foam will foam to come into contact with and to bond to the internal surface of the vehicle frame. In this way a firmly bound structural reinforcement is provided which resists upward movement of the floor portion of the vehicle due to rear impact collision.

What is claimed is:

1. A structural reinforcement for reinforcing a hollow structural member comprising:

a rigid injection molded plastic pre-formed structural reinforcing member comprising two substantially enclosed honeycomb structures at opposite ends of the rigid pre-formed structural reinforcing member and a ribbed intermediate portion, and having an exterior shape conforming substantially to the interior cross section of said hollow structural member, said exterior shape varying in thickness along the length of said structural reinforcing member to mirror the variations of said interior cross section;

unfoamed expansive structual adhesive material contained between said structural reinforcing member and said hollow structural member, said adhesive material approaches an internal surface of the hollow structural member;

wherein said unfoamed expansive adhesive material is activated to both expand and to act as an adhesive when heated;

wherein said unfoamed expansive adhesive material is dry and not tacky to the touch prior to activation of said material;

wherein said structural reinforcing member further comprises at least one lug attached to and moulded with said structural reinforcing member and locating said member within said hollow structural member when said structural reinforcing member is placed within said hollow structural member prior to activation of said material, said at least one lug being substantially free of said adhesive material; and wherein said structural reinforcing member is bonded to said internal surface of said hollow structural member after activation of said material.

2. The structural reinforcing member according to claim 1, in which the size of said reinforcing member including the expandable material is that there is a clearance of not more than 1 cm between said reinforcing member and said interior wall of said hollow structural member.

3. The structural reinforcing member according to claim 1, in which the reinforcing member is an injection molded plastic and has a cellular, honeycomb or ribbed internal structure.

4. The structural reinforcing member according to claim 1, in which the reinforcing member is made from a thermosetting resin.

5. The structural reinforcing member according to claim 1, in which the expandable adhesive material is an epoxy-base resin.

6. The structural reinforcing member according to claim 1, in which the expandable material is applied over part of each of the top and bottom and the sides of the reinforcing member.

7. The structural reinforcing member according to claim 1, in which said member is provided with means enabling fluid drainage.

8. A structural reinforcing member of claim 1, in which said expandable adhesive material is applied by over moulding or two shot injection moulding.

9. The structural reinforcing member according to claim 1, in which the expandable material can be activated at a temperature of a curing step in an electrocoat process.

10. The structural reinforcing member according to claim 1, in which the expandable material expands at from 130° C. to 150° C.

11. The structural reinforcing member according to claim 1, in which the reinforcing member is made from filled polyamide.

12. The structural reinforcing member according to claim 11, in which the filler is selected from glass fibre or carbon fibre.

13. A structural reinforcement for reinforcing a base of a hollow pillar of an automotive vehicle, comprising:
   a rigid pre-formed structural reinforcing member located within the hollow pillar of the automotive vehicle, the reinforcing member comprising:
      i) a first substantially enclosed honeycomb structure at a first end of a width of the reinforcing member and a second substantially enclosed honeycomb structure at a second end of the width of the reinforcing member wherein the first structure and the second structure extend along a length of the reinforcing member;
      ii) a ribbed intermediate portion disposed between the first structure and the second structure, the ribbed intermediate portion including a tube extending along the length of the reinforcing member; and
      iii) an exterior shape with a relatively thin section between two relatively thicker sections along the length for mirroring variations of an interior cross section of said hollow pillar;
   unfoamed expansive adhesive material located about the first structure and the second structure wherein the reinforcing member is positioned to form a clearance of less than 1 centimeter between the adhesive material and the pillar;
   wherein the unfoamed expansive adhesive material is activated to both expand and to act as an adhesive when heated;
   wherein the unfoamed expansive adhesive material is dry and not tacky to the touch prior to activation of said material;
   wherein the structural reinforcing member further comprises at least one lug attached to the structural reinforcing member and locating the member within the pillar prior to activation of the adhesive material; and
   wherein the structural reinforcing member is bonded to the internal surface of the hollow structural member after activation of the adhesive material.

14. The structural reinforcing member according to claim 13 wherein the middle portion includes transverse and longitudinal ribs.

15. The structural reinforcing member according to claim 13 wherein the reinforcing member is rigid and provides structural reinforcement in conjunction with the adhesive material.

16. The structural reinforcing member according to claim 13, in which the expandable material can be activated at a temperature of a curing step in an electrocoat process.

17. The structural reinforcing member according to claim 13, in which the reinforcing member is made from a thermosetting resin.

18. The structural reinforcing member according to claim 13, in which the expandable adhesive material is an epoxy-base resin.

19. The structural reinforcing member according to claim 13, in which the expandable material is applied over part of each of the top and bottom and the sides of the reinforcing member.

20. The structural reinforcing member according to claim 13, in which said member is provided with means enabling fluid drainage.

21. The structural reinforcing member according to claim 13, in which the expandable material expands at from 130° C. to 150° C.

22. A structural reinforcing member according to claim 13, in which said expandable adhesive material is applied by over moulding or two shot injection moulding.

23. The structural reinforcing member according to claim 13, in which the reinforcing member is an injection molded plastic.

24. The structural reinforcing member according to claim 23, in which the reinforcing member is made from filled polyamide.

25. The structural reinforcing member according to claim 24, in which the filler is selected from glass fibre or carbon fibre.

26. A structural reinforcement for reinforcing a hollow structural member comprising:
   a rigid plastic pre-formed structural reinforcing member comprising two substantially enclosed honeycomb structures at opposite ends of the rigid pre-formed structural reinforcing member and a ribbed intermediate portion, and having an exterior shape conforming substantially to the interior cross section of said hollow structural member, said exterior shape varying in thickness along the length of said structural reinforcing member to mirror the variations of said interior cross section;
   unfoamed expansive structural adhesive material contained between said structural reinforcing member and said hollow structural member, said adhesive material approaches an internal surface of the hollow structural member;
   wherein said unfoamed expansive adhesive material is activated to both expand and to act as an adhesive when heated;
   wherein said unfoamed expansive adhesive material is dry and not tacky to the touch prior to activation of said material;

wherein said structural reinforcing member further comprises at least one lug attached to and moulded with said structural reinforcing member and locating said member within said hollow structural member when said structural reinforcing member is placed within said hollow structural member prior to activation of said material; and wherein said structural reinforcing member is bonded to said internal surface of said hollow structural member after activation of said material.

27. The structural reinforcing member according to claim 26 in which the size of said reinforcing member including the expandable material is such that there is a clearance of not more than 1 cm between said reinforcing member and said interior wall of said hollow structural member.

28. The structural reinforcing member according to claim 26, in which said member is provided with means enabling fluid drainage.

29. A structural reinforcement system, comprising:

a rigid pre-formed outer hollow member;

a rigid performed internal structure comprising two substantially enclosed honeycomb structures at opposite ends of the rigid pre-formed internal structure and an intermediate plurality of ribs wherein;
   i) each of the plurality of ribs extends toward the outer hollow portion; and
   ii) the plurality of ribs is arranged in a criss-cross configuration relative to each other;

unfoamed expansive structural adhesive material disposed upon the internal member;

wherein at least one said plurality of ribs approaches said adhesive material;

wherein said unfoamed expansive adhesive material is activated to both expand and to act as an adhesive when heated;

wherein said unfoamed expansive adhesive material is dry and not tacky to the touch prior to activation of said material;

wherein said internal member further comprises at least one locator attached to and moulded with said internal structure and locating said internal structure within said hollow structural member when said internal structure is placed within said hollow structural member prior to activation of said material; and wherein said internal structure is bonded to said internal surface of said hollow structural member after activation of said material.

30. The system according to claim 29 wherein the internal structure is formed of a rigid plastic material.

31. The system according to claim 29 wherein the at least one locator is a lug.

32. The system according to claim 29 wherein the hollow member is rectangular in shape.

33. The system according to claim 29 wherein the hollow member is formed of metal.

34. The system according to claim 29 wherein there is a clearance between the internal structure and the outer hollow member.

35. The system according to claim 29 wherein the structural adhesive material is positioned between the outer hollow member and the internal structure.

36. The system according to claim 35 wherein said adhesive material approaches an internal surface of said hollow member.

* * * * *